Aug. 5, 1924.  
E. F. NORELIUS  
1,503,597  
ROLLER TRUCK FRAME FOR TRACTORS  
Filed Sept. 16, 1919  3 Sheets-Sheet 1

INVENTOR  
Emil F. Norelius  
BY Strong & Townsend  
ATTORNEYS

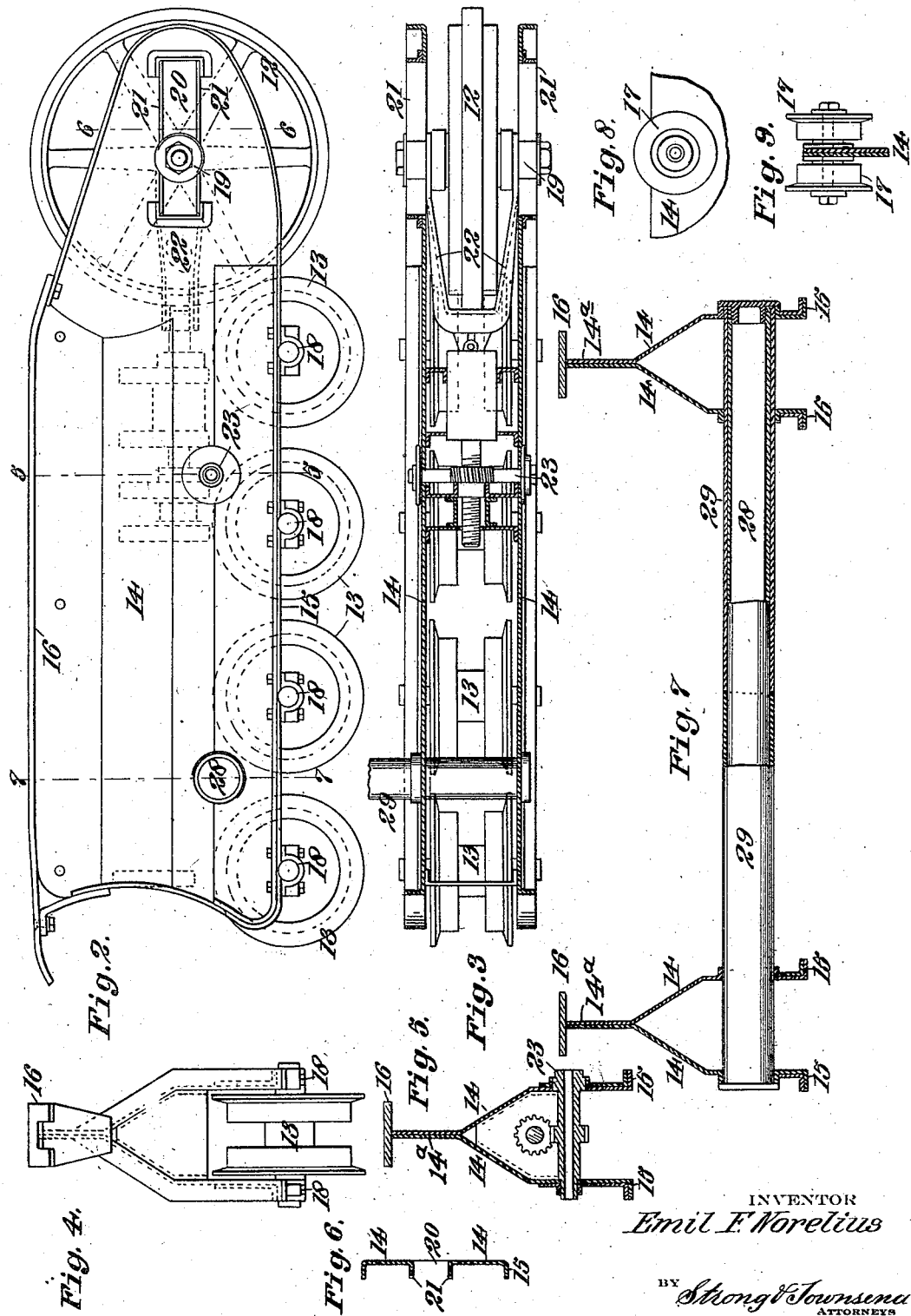

Aug. 5, 1924. 1,503,597
E. F. NORELIUS
ROLLER TRUCK FRAME FOR TRACTORS
Filed Sept. 16, 1919    3 Sheets-Sheet 3

INVENTOR
Emil F. Norelius.
BY
Strong & Townsend
ATTORNEYS

Patented Aug. 5, 1924.

1,503,597

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

ROLLER-TRUCK FRAME FOR TRACTORS.

Application filed September 16, 1919. Serial No. 324,225.

*To all whom it may concern:*

Be it known that I, EMIL F. NORELIUS, a citizen of the United States, residing at Peoria, in the county of Peoria and State of Illinois, have invented new and useful Improvements in Roller-Truck Frames for Tractors, of which the following is a specification.

This invention relates to tractors of the chain track type, and more especially to a roller truck frame for such tractors.

It has for its object to produce a strong, light, neat appearing truck mechanism capable of easy production. The side plates forming the roller truck frame are preferably of pressed steel, said plates being so shaped that they contact at their upper edges to effectually enclose the rollers and connected parts above the same.

A novel method of connecting opposite truck members together to permit independent rocking movement and at the same time maintain said truck members in parallel relation is also involved in the present construction; this novel connecting means being preferably of light or pressed steel construction also. On account of the shape of the truck frame, enclosed as it is above the rollers, I provide novel means for shifting the front idler wheel of the truck fore and aft for the purpose of taking up slack in the track.

Referring to the accompanying drawings:

Fig. 2 shows a side elevation of a roller truck mechanism embodying my invention.

Fig. 3 shows a plan view, in section, of the device shown in Fig. 2.

Fig. 4 shows a rear elevation of the device shown in Fig. 2.

Fig. 5 shows a sectional view, taken on the line 5—5 of Fig. 2 and illustrating the means for shifting the front idler fore and aft.

Fig. 6 shows a detail, sectional view, taken on the line 6—6 of Fig. 2.

Fig. 7 shows a sectional view, taken on the line 7—7 of Fig. 2, the truck rollers having been omitted for the sake of simplicity.

Figs. 8 and 9 show detail views exemplifying a modified arrangement, wherein rollers may be employed at the upper edge of the truck frame to support the upper run of the chain track in lieu of the wearing plate shown in Fig. 2.

Figure 1:
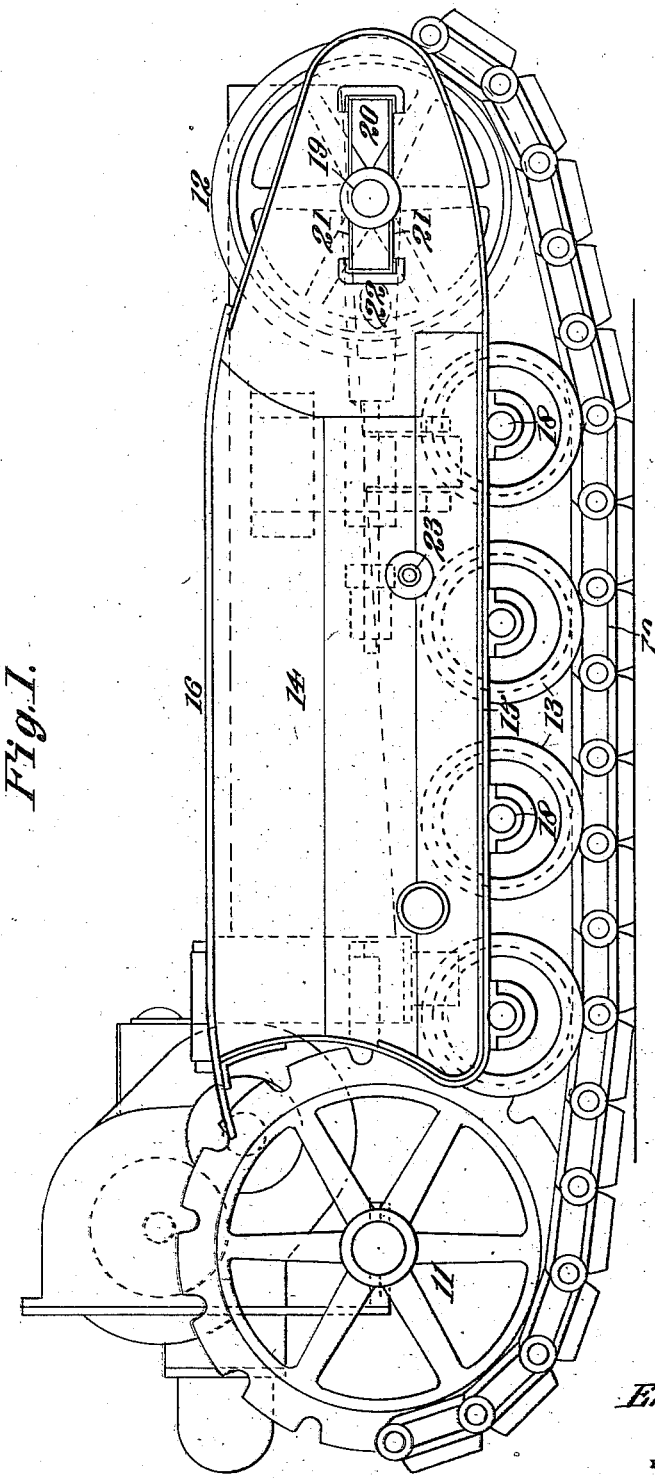
Fig. 1 shows a side elevation of a tractor embodying my invention.

The tractor to which my invention is applied comprises the usual main frame, at opposite sides of which are roller truck mechanisms, these roller truck mechanisms comprising in general a chain track 10, a toothed sprocket wheel 11 for operating said track, an idler sprocket wheel 12, over which said track operates at its forward end, and a series of supporting rollers 13. The idler sprocket wheel 12 and the supporting rollers 13 are carried upon a roller truck frame, comprising side plates 14, spaced apart at their lower edges to receive the rollers and sprocket wheel between it and form journal supports for the latter.

These side plates 14, in the present invention, are formed of pressed steel and so shaped that they are made to contact at their upper edges, thereby completely housing or covering the supporting rollers above. At the front and rear edges and also at the lower edges of the side plates 14 are formed marginal flanges 15 which serve to reinforce and strengthen these side plates. At the upper edges of the side plates a flange or rail 16 is arranged, which rail preferably is detachably connected to the side plates and serves as a support for the upper run of the chain track.

In place of the supporting rail 16 I may employ rollers 17, as shown in Figs. 8 and 9. The supporting rollers 13 are preferably journaled in bearings 18 secured to the bottom flanges 15 of the side plates. The idler sprocket wheel 12 is journaled in bearings 19 which are slidably mounted in slots 20, formed by cutting away the side plate and pressing the material thereof outwardly to form flanges 21. The purpose of these slots is to permit adjustment of the tension of the chain track by shifting the front idler fore and aft. This idler sprocket wheel is held in place by means of a yoke 22 extending rearwardly and having a screw connection with a transverse shaft 23 journaled on the side plate. This shaft 23 is adapted to be operated from the exterior of the truck frame to facilitate the adjustment of the idler wheel.

Figure 10:
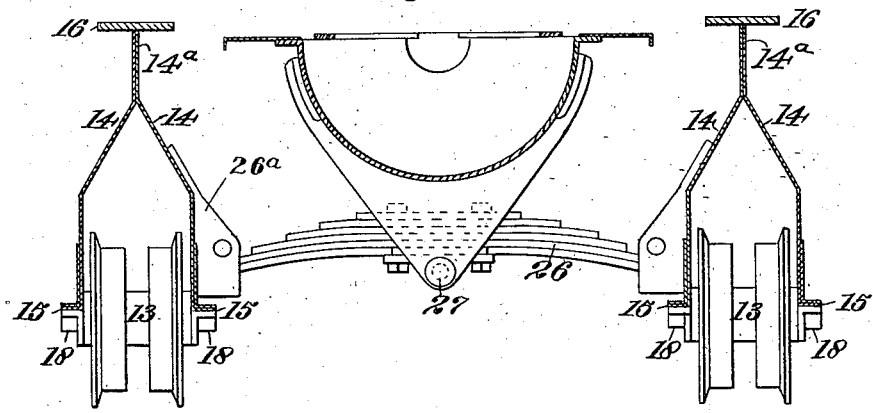
Fig. 10 shows a schematic view of the forward support for the main frame upon the truck mechanism.
Figure 11:
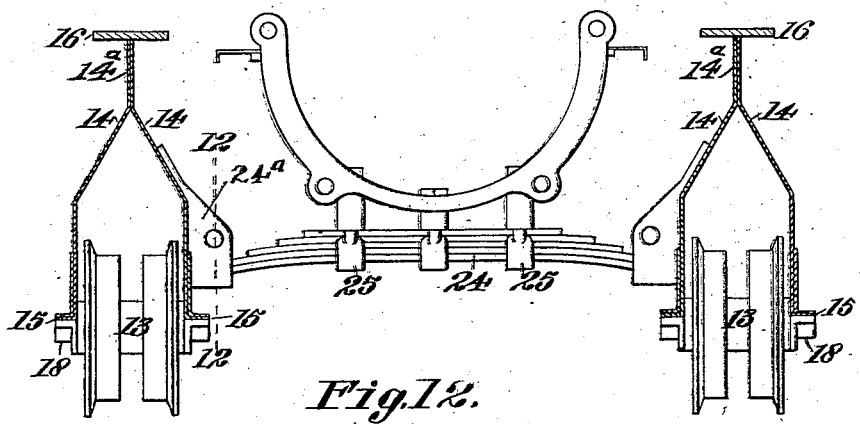
Fig. 11 shows a similar view of the rear support.
Figure 12:
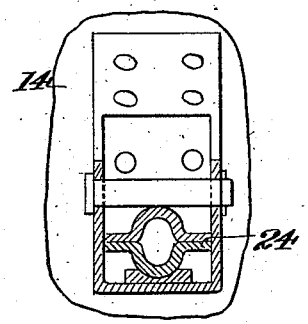
Fig. 12 shows a detail, sectional view, taken on the line 12—12 of Fig. 11.

With light truck frames, as shown and described herein, it is preferable to employ special suspension means for the main frame. This suspension means is shown in Figs. 10 and 11 where it will be seen I have provided a leaf spring 24 connected by shackles to opposite truck frames near the lower edges of the latter; the main frame in turn being fastened rigidly to the leaf spring 24 by means of clips 25. The said shackles are supported on the truck frames by brackets 24ª. The suspension means at the forward end of the main frame comprises a transversely extending equalizer bar, also in the form of a leaf spring 26, connected by shackles to opposite truck frames and having a pivotal connection 27 with the main frame. Brackets 26ª similar to the brackets 24ª are used to connect said last-named shackles to the truck frames. This arrangement provides a three-point suspension for the main frame and eliminates excessive strains and twists throughout. However, in connection with this form of suspension, it is necessary to provide special means to connect opposite truck mechanisms together, so that they will retain their parallel relation, said connecting means at the the same time permitting independent rocking movement of these truck mechanisms.

This connecting means is shown in Fig. 7, where it will be seen to comprise a tubular shaft 28, extending transversely and passing through opposite truck frames; the truck frames being journaled upon this shaft 28 by means of separate sleeves 29. Consequently, the truck mechanisms are free to rock independently and, due to the long bearing surface afforded by the sleeves 29, they are held effectively in parallel relation.

Such a construction as is disclosed herein is admirably suited for small, light tractors such as are used in orchards and small farms. The truck frame so encloses the rollers and connected parts as to protect them from the dirt and trash, and this enclosed effect enhances the appearance of the tractor and presents a simple and neat effect. The suspension of the main frame is carried low on the truck mechanisms and this permits a reduction in the height of the tractor, a thing to be desired in orchard work. The truck frame is easy to produce, there being a minimum of machine work involved.

Various changes in the construction and arrangement of the several parts herein shown and described may be employed without departing from the spirit of my invention as disclosed in the appended claims.

It will be noted that where the upper edges of the opposite side plates of the roller truck frame are brought together a stiffening web 14ª is formed which adds considerably to the strength of the truck frame. Also this form of truck frame provides steeply sloping walls at each side which serve to deflect any mud falling thereon and prevent accumulation of débris at the top of the roller truck frame. It will be understood that where tractors of this type are operated in soft ground the track shoes carry with them considerable mud and dirt which is dropped from the upper run of the track and falls upon the truck frame beneath. Where these truck frames are flat on top such mud will accumulate and add considerable to the weight of the tractor, and, in cold weather, become frozen and consequently difficult to remove. The sloping sides of the present truck frames overcome this objection.

This application is a continuation in part of my prior application, Serial No. 320,237, filed August 27th, 1919, which has matured in Patent No. 1,429,449, dated September 19th, 1922.

Having thus described my invention, what I claim and desire to secure by Letters Patent is—

1. A roller truck frame for chain track tractors formed of pressed steel side plates contacting at their upper edges, and spaced apart at their lower edges to receive the truck rollers between them.

2. A roller truck frame for chain track tractors formed of pressed steel side plates contacting at their upper edges and spaced apart at their lower edges to receive the truck rollers between them, and flanges arranged at the marginal edges of the side plates to strengthen and reinforce the latter, the flange at the upper marginal edges constituting also a guide rail for the upper run of the track.

3. A roller truck frame having spaced side plates to receive the supporting rollers between said plates, being brought together at their upper edges to cover the rollers above, an idler wheel at the forward end of the side plates over which the track runs, said idler wheel being journaled in bearings slidable in slots formed in said side plates, and adjusting means operable from the exterior of the enclosed side plates for shifting said idler wheel back and forth.

4. In a vehicle, tractor truck mechanism comprising a truck frame carrying a plurality of rollers, a pair of sprocket wheels and an endless chain track operating upon said sprocket wheels and passing beneath said rollers, said truck frame being formed of spaced side plates between which the rollers are journaled, said side plates being brought together at their upper edges to form a narrow ridge at the top with steeply sloping sides.

5. In a vehicle, tractor truck mechanism comprising a truck frame carrying a plurality of rollers, a pair of sprocket wheels and an endless chain track operating upon said sprocket wheels and passing beneath said rollers, said truck frame being formed of a pair of spaced side plates between which the supporting rollers are journaled, said side plates being brought together at their upper edges, the meeting edges of opposite side plates serving to form a stiffening web at the top of the frame.

6. In a tractor of the chain track type a main frame, a roller truck mechanism at each side thereof each including a frame formed of spaced side plates having their upper edges sloping inwardly and terminating in a narrow ridge at the top, transversely extending load supporting connections near each end of the main frame, a bracket on the inside truck frame plates near each end thereof and connections between said brackets and load supporting connections.

In testimony whereof I have hereunto set my hand in the presence of two subscribing witnesses.

EMIL F. NORELIUS.

Witnesses:
FRED GROTTS,
WILLIAM TURNBULL.